United States Patent [19]
Gleckman

[11] Patent Number: 5,795,049
[45] Date of Patent: Aug. 18, 1998

[54] IMAGE PROJECTION SYSTEM

[75] Inventor: Philip L. Gleckman, Wilsonville, Oreg.

[73] Assignee: In Focus Systems, Inc., Wilsonville, Oreg.

[21] Appl. No.: 703,741

[22] Filed: Aug. 27, 1996

[51] Int. Cl.[6] .................................................. G03B 21/14
[52] U.S. Cl. .................................................. 353/122
[58] Field of Search ..................................... 353/122, 121; 349/62, 63, 67, 61, 5; 385/901

[56] References Cited

U.S. PATENT DOCUMENTS 5,108,172  4/1992  Flasck ................................. 353/31
5,459,592  10/1995  Shibatani et al. ..................... 349/62
5,513,023  4/1996  Fritz et al. ............................. 349/9
5,535,025  7/1996  Hegg .................................... 385/901

*Primary Examiner*—William Dowling
*Attorney, Agent, or Firm*—Timothy M. Carlson, Esq.

[57] ABSTRACT

An image projector is provided with a light valve having an upstream side and an downstream side. A light source is disposed on the upstream side of the light valve, and a front lens system with an entrance pupil is disposed on the downstream side of the light valve. A back optical system is disposed between the light source and the light valve. The back optical system has a nonimaging device with an exit aperture that is either imaged into the entrance pupil of the front lens system (Kohler) or imaged onto the light valve (Abbe).

19 Claims, 6 Drawing Sheets

IMAGE PROJECTION SYSTEM

FIELD OF THE INVENTION

The present invention pertains to an image projection system, and in particular to optical path components for an image projection system.

BACKGROUND AND SUMMARY OF THE INVENTION

Projection systems have been used for years to project motion pictures and still photographs onto screens for viewing. More recently, presentations using multimedia projection systems have become popular for purposes such as sales demonstrations, business meetings, and classroom sessions. In a common mode of operation, multimedia projection systems receive analog video signals from a personal computer (PC). The video signals represent still, partial-, or full-motion display images of the type rendered by the PC. The analog video signals are converted into digital video signals to control a digitally-driven light valve, such as a reflective micro-mirror-type light valve or a transmissive liquid crystal light valve (LCD), which form display images.

A popular type of multimedia projection system is a projector that incorporates a light source and optical path components upstream and downstream of the light valve to project the display images onto a display screen. Examples such projectors include those sold under the trademark LITEPRO® by In Focus Systems, Inc. of Wilsonville, Oreg., the assignee of the present application.

Significant effort has been invested into developing light-weight, compact projectors, in order to increase the convenience of use. Decreased weight is particularly important for a multimedia projector designed for the mobile presentation market, wherein a presenter typically carries the projector on airplanes, through airport terminals, hotels, etc., and into presentation rooms for delivery of presentations. Thus, lightness of weight and compactness are two of the most noticeable and desirable attributes of portable multimedia projectors.

Efforts to decrease weight and increase compactness have been limited in part by the numerous mirrors and objective lenses in conventional projection optical systems. Such mirrors and lenses add significant bulk and weight to a projector. Furthermore, bulky frames are required for precisely positioning these optical elements along the projector optical path. Dispersion of these components in the projector may also cause heat generation in numerous dispersed areas of the projector, requiring a complex cooling system that adds additional weight and bulk to the projector.

Moreover, such mirrors, lenses and frames are expensive, especially when they require custom grinding. These components are also subject to damage and misalignment if the projector is inadvertently dropped or otherwise mishandled.

Thus, in light of these disadvantages, it is a principle object of the present invention to provide a light-weight projector optical system.

It is another object of the present invention to provide a compact projector optical system.

It is a further object of the present invention to provide an inexpensive projector optical system.

It is a further object of the present invention to provide a rugged projector optical system that is relatively invulnerable to mechanical damage.

In accordance with a preferred embodiment of the present invention an image projector is provided with a light source, a nonimaging device defined by the edge ray method positioned downstream of the light source, light valve positioned downstream of the nonimaging device, and a front lens system positioned downstream of the light valve. The light from the light source is projectable through the nonimaging device onto the light valve.

Such application of the nonimaging device permits a light-weight, tough and versatile light pipe to be utilized in the projector optical system upstream of the light valve, eliminating the need for numerous of the lenses and/or mirrors present in conventional image projectors.

DETAILED DESCRIPTION OF PREFERRED EMBODIMENTS

Figure 1:
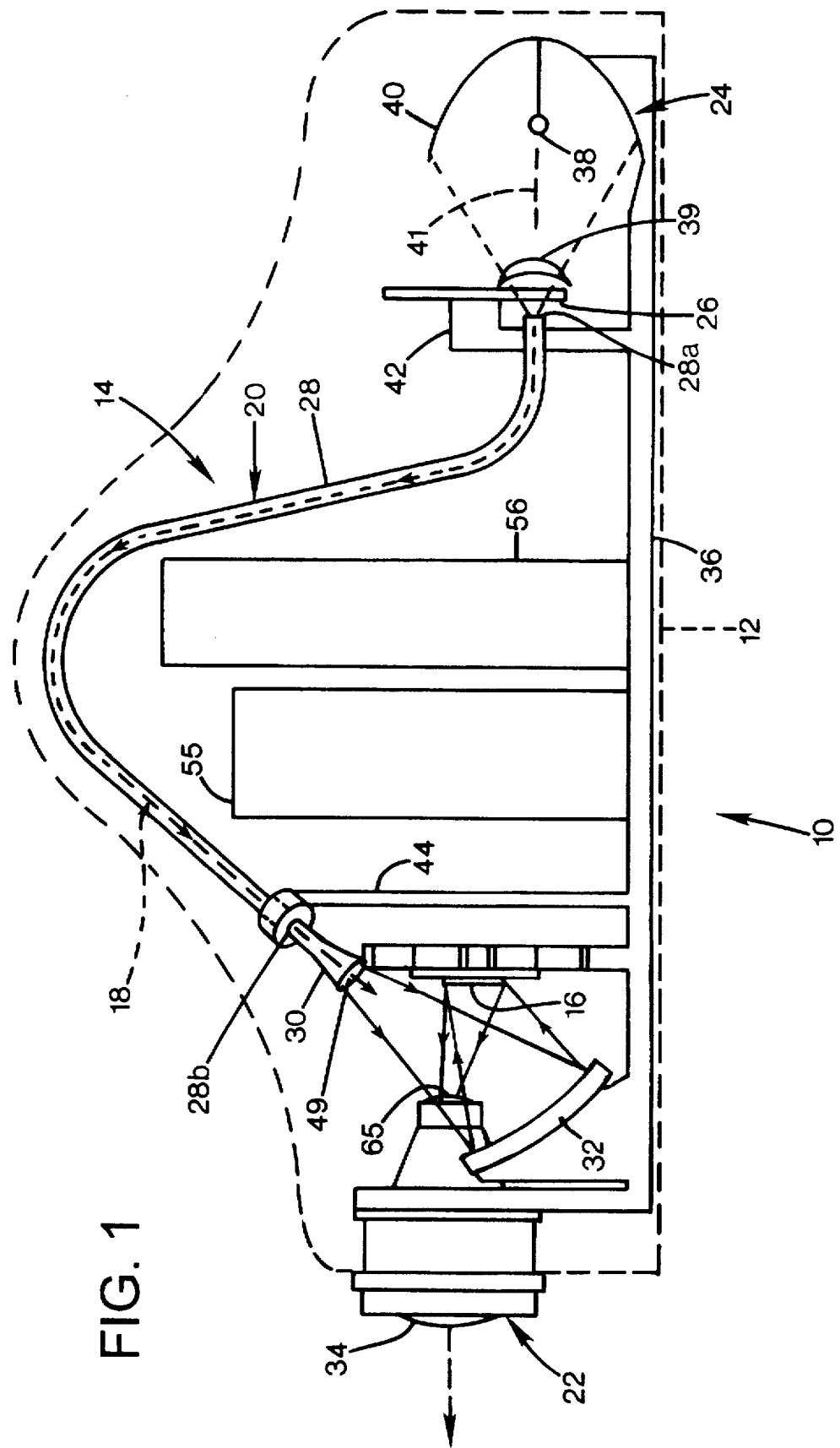
FIG. 1 a is a side elevational, cutaway view of portion of an image projector incorporating a nonimaging optical element according to the present invention.

FIG. 1 generally shows an image projector 10 in accordance with a preferred embodiment of the present invention. The projector includes a housing 12 that supports a projection optical system 14 providing Kohler-type illumination. The optical system includes an electronically driven light valve 16 situated along an optical path 18, with a back optical system 20 located upstream of the light valve 16, and a front optical system 22 located downstream of the light valve. The back optical system 20 includes a light source 24, a color wheel 26, a light pipe 28, a nonimaging optical device 30 and a concave spherical mirror 32. The front optical system 22 includes a projection lens 34. The optical system components are mounted upon a frame 36 that is mounted within the projector housing 12. As will be discussed, the nonimaging device is formed according to the edge ray method and has an exit aperture that is either imaged into the entrance pupil of the front lens system (Kohler) or imaged onto the light valve (Abbe).

The image projector depicted in FIG. 1 will now be described in detail, from the light source 24 forward. Referring to the back optical system 20, the light source 24 is preferably a metal halide lamp 38 housed within an elliptical mirror 40. An optional meniscus lens 39 following the elliptical mirror maybe disposed to boost the concentration of light at the focus. The elliptical mirror defines an optical axis 41. The color wheel 26 is positioned downstream of the light source, with the periphery of the color wheel registered with the light source optical axis 41. The color wheel is transmissive, with red, green and blue (RGB) filters provided in alternating sectors along the periphery of the color wheel. A color wheel drive motor 42 mounted adjacent the color wheel 26 selectively rotates the color wheel.

The light pipe 28 is elongated with squared-off flat upstream and downstream end surfaces 28a, 28b. The upstream end 28a is registered with the focus of the meniscus lens 39. The downstream end surface 28b of the light pipe 28 is held at a preferred orientation by a mounting bracket 44. The light pipe 28 preferably has a single transparent dielectric core, which in combination with cladding provides a high numerical aperture (NA) of at least 0.50, permitting very compact light gathering, and total internal reflection for efficient light transmission. The light pipe NA is preferably matched to the NA of the meniscus lens/ elliptical mirror system 39, 40. The light pipe may be flexible or rigid. An example of a preferred light pipe is a light pipe manufactured by the Lumenyte Corporation having a 4.7 mm diameter, a 0.660 NA, a core with an index of refraction (n) of 1.491, and a cladding with an n of 1.34. It is to be understood that the light pipe may also be constructed of various other suitable materials, such as glass or acrylic with or without a cladding.

Figure 2A:
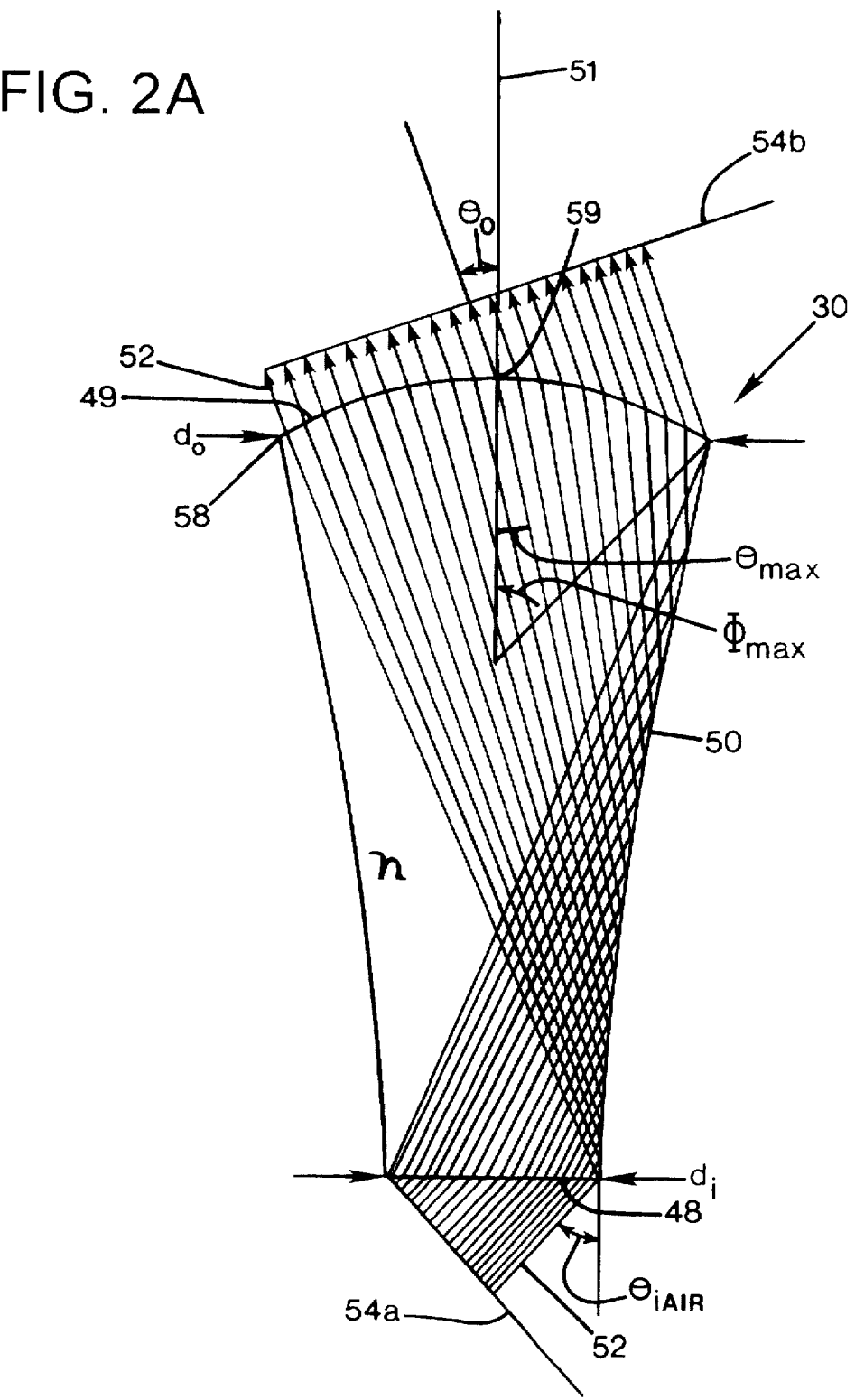
FIG. 2A depicts a nonimaging device in accordance with one aspect of the present invention.

As best shown in FIG. 2A, the nonimaging device 30 works with total internal reflection as a light expander. In general, the exemplary preferred nonimaging device 30 is made of acrylic and has a substantially conical body 50 with a small diameter inlet port 48, and a large diameter exit port 49. The inlet port 48 is flat and cemented or otherwise directly attached to the downstream end surface 28b of the light pipe. The large diameter exit port 49 faces downstream toward the spherical mirror 32 and has a convex (e.g. spherical) shape to provide the nonimaging device 30 with desired refractive properties in order to shorten the overall length of the nonimaging device. The conical body 50 is formed with axial rotational symmetry about an optical axis 51, and is defined by a longitudinally curved aspheric wall, as is discussed below.

In order to provide total internal reflection, the physical structure of the nonimaging device wall is a reflective optical interface, i.e. the boundary of two different optical materials. The illustrated nonimaging device wall forms a dielectric (e.g. acrylic)-air boundary. It is also to be understood that effective nonimaging devices having other boundary types may be constructed, such as air-metal, dielectric-metal, and dielectric-dielectric. The dielectric media of the light pipe 28 and the nonimaging device 30 has preferably substantially the same index of refraction in order to minimize light loss through reflection at the interface of the light pipe 28 and the nonimaging device 30.

The nonimaging device 30 is designed based on the values of certain optical system components including the spherical mirror 32, the reflective light valve 16, and the projection lens 34. The shape of the nonimaging device is determined by the edge ray method, which applies the equal optical path principle to edge rays passing through the nonimaging device. The light expanding nature of the present nonimaging device 30 is apparent in the spacing between the light rays 52 exiting the exit port 49 being greater than the spacing between light rays entering the inlet port 48.

As shown in FIG. 2A, the maximum inlet angle of light entering the nonimaging device inlet port 48 is Θi, and the maximum outlet angle of light exiting the nonimaging device exit port 49 is Θo. In general, the edge ray method requires a nonimaging device shape such that all light rays 52 entering the inlet port 48 at a maximum angle Θi are reflected a single time against the wall of the conical body 50 before exiting the exit port 49. Under the equal optical path principle, all of the light rays 52 have an equal optical path length as measured between two planes 54a, 54b perpendicular to the light rays (i.e. parallel to the wave front) entering and exiting the inlet and exit ports 48, 49 of the nonimaging device. The requirement of equal optical path length produces a unique curved wall shape defining the conical body 50, given a particular exit port surface curvature.

The specific dimensions and design relations of the exemplary preferred nonimaging device 30 and light pipe 28 will now be described. The light pipe NA and cross sectional diameter, as well as the geometry of the nonimaging device, is determined by the "etendue" of the system formed by the projection lens 34 and light valve 16. Etendue is generally defined as the 4-dimensional area bounding a beam of light in space (x,y) and direction (L,M.), that determines the light flux flow (or throughput) that can pass through an optical system. Etendue is invariant throughout an optical system. For a discussion of etendue, see Welford and Winston, pages 15, 16 and 225–230.

In the present embodiment of axially symmetric Kohler illumination, the two dimensional etendue is given by the product of light-valve diagonal dimension and the NA of the projection lens 34. The projection lens 34 is f/3.0 (NA= 0.167). One preferred light valve, the SVGA DMD™ light valve, a reflective digitally-driven micro mirror light valve manufactured by Texas Instruments Incorporated of Dallas, Tex., has a diagonal dimension of 18.6 mm (including an alignment tolerance margin). Given these values, the 2-D etendue is 18.6 mm×0.167=3.10 mm. By conservation of etendue, a light pipe of NA=0.660 is required to have a diameter of 3.102 mm÷0.660=4.7 mm to avoid losing light. The inlet port 48 of the nonimaging device also has a NA of 0.660 to match that of the light pipe, in order to maintain a minimum size while accepting all of the light emitted by the light pipe. The index of refraction n of the nonimaging device medium is set at 1.491, which is equal to that of the light pipe in order to minimize refractive losses. Accordingly, the diameter (di) of the inlet port is also equal to 4.7 mm.

Figure 5A:
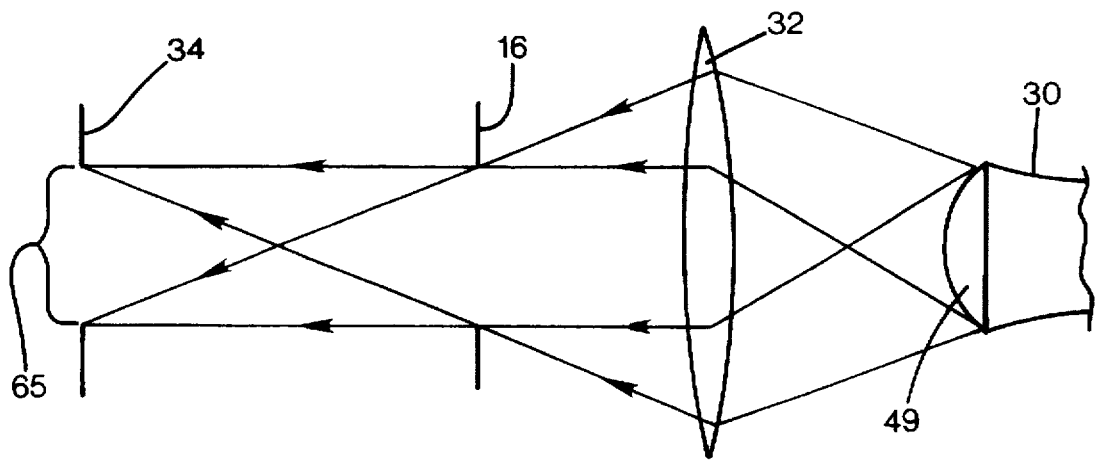
FIG. 5A schematically depict a Kohler-type optical system in accordance with one embodiment of the present invention.

In the present Kohler illumination case, the nonimaging device exit aperture (which is defined by the exit port 49) is imaged into the entrance pupil 65 of the projection lens 34. FIG. 5A schematically shows the Kohler-type illumination of the present embodiment. Note that spherical mirror 32 is depicted as a lens, and reflective light valve 16 is depicted as transmissive for simplicity of illustration. The diameter (do) of the nonimaging device exit port 49 is thus determined by the magnification of the exit aperture into the entrance pupil 65. By selection of a specific optical subsystem including the spherical mirror 32 and the projection lens 34, the magnification and thus the exit port diameter may be determined. In the preferred embodiment, the exit port 49 has a 9.53 mm diameter.

The semi-angle emerging from nonimaging device exit port is in turn determined by etendue conservation, according the relation:

$$do := di \cdot \frac{\sin(\Theta iAir)}{\sin(\Theta o)}.$$

The value ΘiAir is calculated based on considering the inlet and exit ports 48, 49 to have air interfaces. Thus, the maximum inlet angle assuming an air interface (ΘiAir) is calculated based on the maximum inlet angle with the light pipe interface. Since the inlet port NA is preferably matched to that of the light pipe, the relation ΘiAir=asin(NA/$n_{air}$) yields ΘiAir=41.3°. Thus, in the embodiment shown in FIGS. 1 and 2A, the 9.53 mm exit port diameter yields a maximum exit angle Θo equal to about 19.0°. The illumination field produced by the exit port 49 and the spherical mirror 32 has a diameter at the light valve 16 that is equal to the diagonal dimension of the light valve plus a small (e.g. 0.8 mm) alignment tolerance margin. The radius of curvature (R) of the exit port 49 is set at 9 mm.

The maximum inlet angle Θi of light entering the inlet port 48 from the abutting light pipe 28 is calculated to be 26.27° from the relation:

$$\Theta i := a\sin\left(\frac{\sin(\Theta i Air)}{n}\right).$$

The angle (Φmax) from the center of curvature of the exit port sphere to the intersection 58 of the sphere and the conical body is calculated to be 23.09°, based on the relation:

$$\Phi max := a\sin\left(\frac{do}{2 \cdot R}\right).$$

The angle (Φ' max) from a light ray path to the optical axis 51 of the nonimaging device is calculated to be 23.31°, based on the relation:

$$\Theta' max := a\sin\left(\frac{\sin(\Theta o - \Phi max)}{n}\right) + \Phi max.$$

Given these values, the height (h) of the nonimaging device along its optical axis 51 is calculated to be 16.51 mm, based on the relation:

$$h := \frac{di + do}{2} \cdot \cot(\Theta' max).$$

The optical path length (OPL) of the light rays is determined by dividing the total OPL into two segments L1max and L3max. L1max and L3max are calculated to be 3.33 mm and 17.98 mm, respectively, and OPL is calculated to be 30.14 mm, under the following relations:

$$L1max := 2 \cdot R \cdot \sin\left(\frac{\Theta o + \Phi max}{2}\right)^2;$$

$$L3max := \sqrt{h^2 \frac{(do + di)^2}{4}}; \text{ and}$$

$$OPL := L1max + n \cdot L3max.$$

The distance (sag) from a plane at the intersection 59 of the exit port sphere 49 and the optical axis 51 to a plane at the intersection 58 of the exit port sphere and the conical body 50 is calculated as sag=1.36 mm under the following relation:

$$sag := R \cdot (1 - \cos(\Phi max)).$$

The shape of the conical body wall is then defined by an iterative calculation based on the edge ray method. A series of light rays 52 are spaced radially across a central plane of the conical body 50, and enter the inlet port at ΦiAir=41.3°, as shown in FIG. 2A. Accordingly the light rays 52 exit the exit port 49 at Φo=19.0°. The overall OPL is set equal to 30.14 mm for all the light rays 52, and the intersection of the L1max and L3max segments traces out the aspheric shape of the conical body wall.

It is to be understood that the specific design of the nonimaging device will vary as appropriate based on the specific light valve, projection lens, and other elements of the optical system.

Turning to the description of the optical system downstream of the nonimaging device 30, the nonimaging device exit port 49 is positioned above the light valve 16 relative to a plane defined by the light valve. The optical axis 51 of the nonimaging device extends diagonally relative to the light valve plane. The spherical mirror 32 is mounted on the frame 36 in front of and below the nonimaging device 30 and the light valve 16. The preferred spherical mirror has a radius of curvature of 77.8 mm. The angle of incidence of light on the reflective light valve is equal to the asin (projection lens NA)=asin(0.167)=9.6°. It is to be understood that this particular orientation of the nonimaging device is exemplary only, and that a variety of other orientations are possible.

As discussed above, the front optical system 22 is preferably a projection lens 34 having an entrance pupil 65. The projection lens may be a fixed focal length lens system as shown in FIG. 1, or alternatively a zoom lens system.

A light valve drive electronics unit 55 containing a CPU is mounted to the frame and is electrically connected to the light valve 16 and to the color wheel motor 42. As will be discussed below, the electronics unit 55 synchronizes the operation of the light valve and color wheel during projector operation. A power supply 56 provides appropriate electrical power for the light source 24 and the electronics unit 55.

The application of the curved light pipe 28 promotes projector lightness, in that it permits the elimination of various objective lenses and mirrors present in the optical systems of conventional projectors. Furthermore, the flexibility of the preferred light pipe 28 permits projector compactness, in that the light pipe can be routed around objects in the projector housing 12, such as the electronics unit 55 and power supply 56 in FIG. 1. It is to be understood that the light pipe is capable of sharper bending than is shown in FIG. 1, and that the light pipe is capable of configuration in various other optical path shapes, as appropriate for various projector configurations possible under the present invention. The plastic light pipe applied to the present projector is also relatively invulnerable to mechanical damage, making for a tough projector that is ideal for portability.

It is further contemplated that the nonimaging device may have a variety of other shapes, such as a convex or concave inlet port 48 to provide desired refractive properties, or a flat exit port 49, in which case the length of the conical body 50 would be increased. The nonimaging device may also be integrally constructed on the end of the light pipe. Furthermore, the above design process is exemplary only and may be modified in various ways.

Operation

Referring to FIG. 1, in operation the elliptical mirror 40 of the metal halide light source 24 focuses the source light on the upstream end surface 28b of the light pipe. The high NA of the light source elliptical mirror and the light pipe permits a high degree of light "squeezing" from the elliptical mirror 40 into the back end 28a of the light pipe 28. Because the upstream end surface is very close to the color wheel 26, the light is transmitted through a small spot area on the color wheel RGB filter region. The light valve drive electronics unit 55 synchronizes the operation of the light valve 16 and the color wheel 26. The drive electronics unit 55 controls the motor 42 to rotate the color wheel 26 at a rate equal to the frame refresh rate of the light valve 16.

The focused light entering the upstream end surface 28a of the light pipe 28 is transmitted through the light pipe via total internal reflection with negligible loss or heat generation, and is transmitted from the light pipe downstream surface 28b into the nonimaging device 30. As shown in FIGS. 1 and 2A, the nonimaging device 30 expands and refracts the light toward the spherical mirror 32. The spherical mirror reflects the light onto the light valve 16. The light incident on the light valve is condensed by the spherical mirror 32 to a circular, highly uniform illumination field with a diameter that is substantially equal to the diagonal of the light valve 16. The light valve modulates and reflects the light to an image plane at the entrance pupil 65 of the projection lens 34. In other words, the exit aperture (exit port 49) of the nonimaging device 30 is imaged with uniform available light flux density onto the entrance pupil 65 of the projection lens (see FIG. 5A).

Given that the light valve is typically rectangular in shape, there will be some amount of light spillage over the edges of the light valve 16 when the light pipe 28 and nonimaging device 30 are of circular cross-section. The spillage is determined by the illuminance distribution in the light valve plane. The spilled light is not reflected to the projection lens. Thus, as indicated in FIG. 5A, the light valve 16 serves as an aperture stop in this embodiment.

Figure 2B:
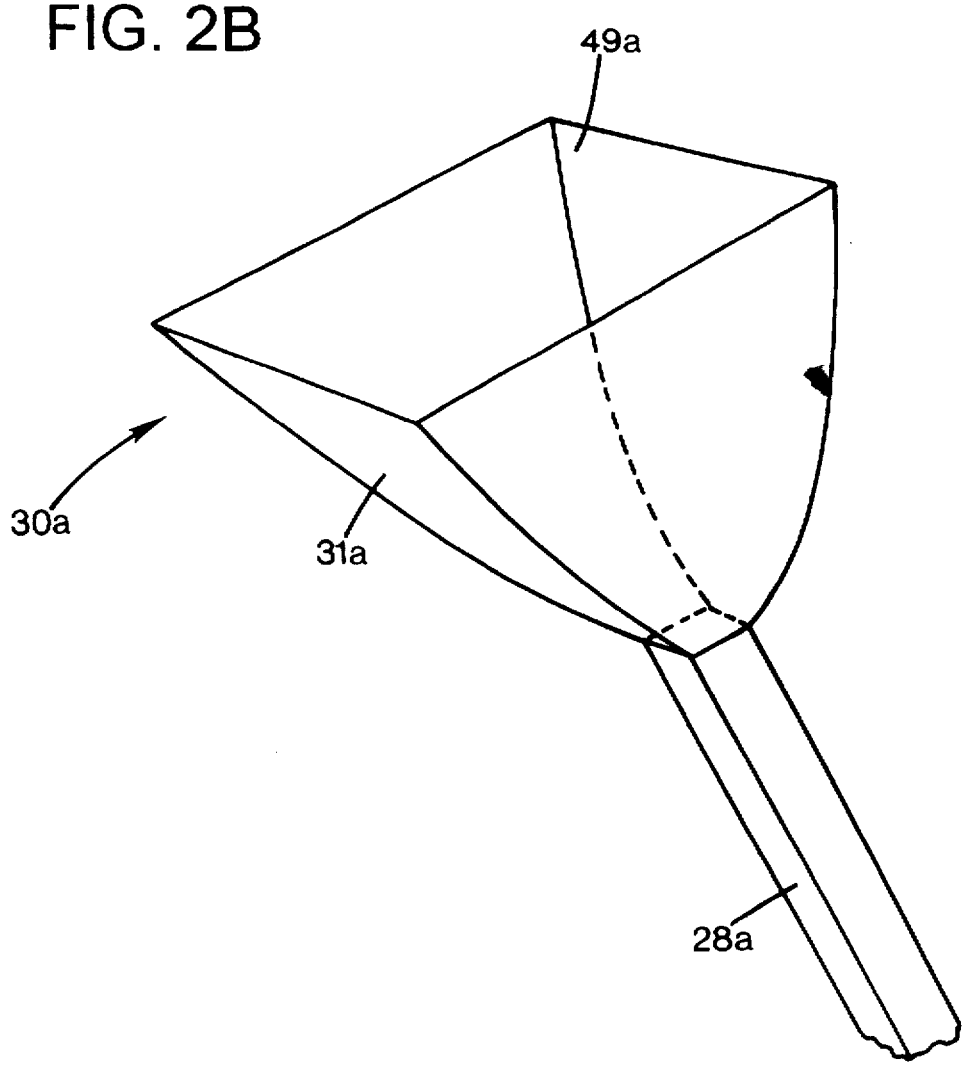
FIG. 2B depicts a nonimaging device in accordance with another aspect of the present invention.

It may be desirable to eliminate this spill-over in some projector embodiments. For instance, light spillage may be undesirable in projectors incorporating relatively large-area light valves, such as XGA light valves. In this case, an Abbe-type illumination system, incorporating a substantially rectangular nonimaging device 30a such as shown in FIG. 2B, may be used to rectangularly format the light field projected therefrom. The rectangular nonimaging device 30a is constructed from sections of trough-shaped (i.e. two-dimensional) nonimaging devices placed at right angles. The rectangular nonimaging device 30a has sidewalls 31a curved according to the edge-ray method as discussed above. For best results, a light pipe 28a of corresponding rectangular cross-section should be used with the rectangular nonimaging device.

It is also contemplated that a light pipe and nonimaging device having a trapezoidal cross-section may be used in the Abbe illumination embodiment. The trapezoidal cross-section acts to correct for "keystone" distortion that may be present in the optical system.

Figure 5B:
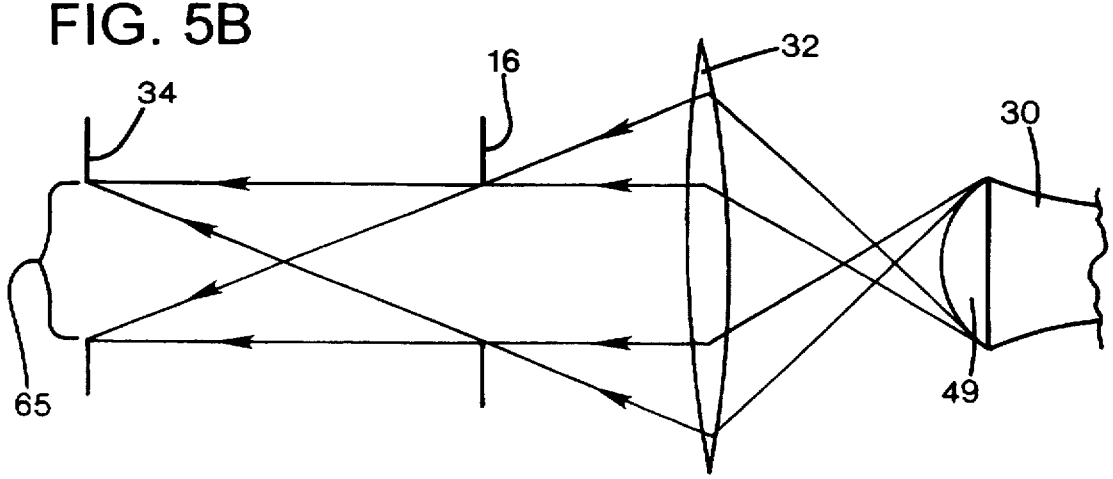
FIG. 5B schematically depict an Abbe-type optical system in accordance with another embodiment of the present invention.

FIG. 5B schematically shows the Abbe-type illumination of this embodiment. With application of the rectangular nonimaging device 30a, the nonimaging device exit aperture (exit port 49a) is imaged onto the rectangular light valve 16. The light valve modulates and reflects the light to the entrance pupil 65 of the projection lens 34 (see FIGS. 1 and 5B). Thus, in this embodiment, the entrance pupil 65 acts as the aperture stop for the projector optical system 14. The dimensions of the substantially rectangular light pipe and nonimaging device of the Abbe illumination case are also determined by etendue conservation. In this case, however, the aspect ratio of the exit aperture (exit port 49a) of the nonimaging device 30a must match the light valve onto which it is imaged, at a typically 4:3 ratio.

Alternative Embodiment No. 1

Figure 3:
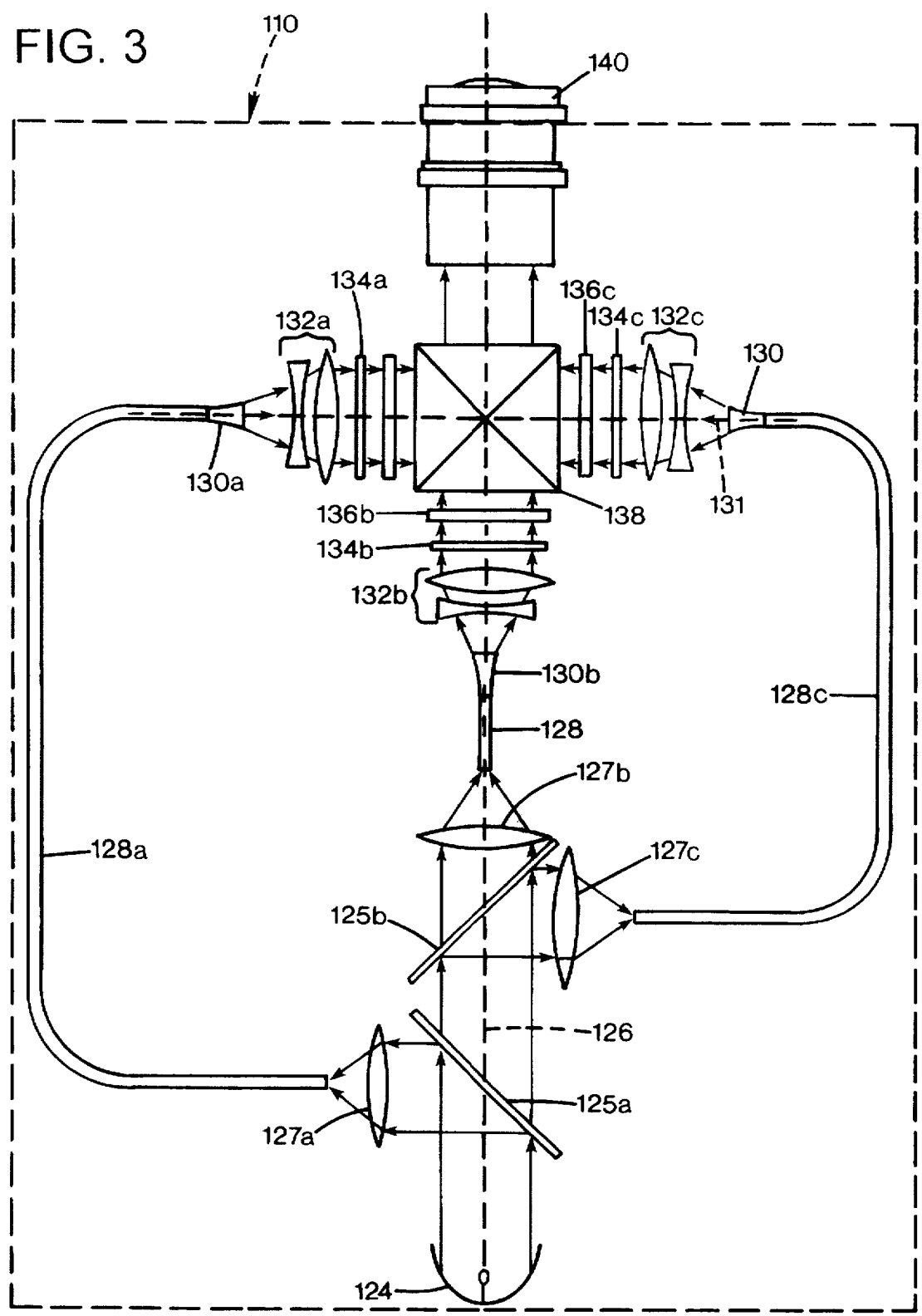
FIG. 3 depicts a projection optical system including a transmissive light valve according to another embodiment of the present invention.

FIG. 3 shows an alternative embodiment of the present invention, in which nonimaging devices 130a, 130b, 130c are applied to a three-path LCD-based projector 110. The projector 110 includes three LCDs 116a, 116b, 116c, one for each of red, green and blue (RGB) light components. A light source 124 projects collimated light to a first dichroic mirror 125a. The first mirror 125a passes green and blue light along a central optical axis 126 and reflects red light laterally away from the central optical axis. The red light is refracted and/or reflected through one or more collection optical elements 127a to a focus at an input end of a first light pipe 128a. The first light pipe is generally U-shaped, with an outlet end that directs the red light perpendicularly toward the central axis 126. The first nonimaging device 130a is attached to the light pipe outlet end.

The green and blue light passing through the first dichroic mirror 125a passes along the central axis 126 to a second dichroic mirror 125b. The second dichroic mirror 125b passes green light and reflects blue light laterally away from the central axis 126 (in the opposite direction from the reflected red light). The green light passing through the second dichroic mirror 125b is refracted through at least one collection optical element 127b to a focus at an input end of a second light pipe 128b. The second light pipe 128b extends along the central axis 126. The second nonimaging device 130b is mounted to the outlet end of the second light pipe 128b.

The blue light is refracted through one or more collection optical elements 127c to a focus at an input end of a third light pipe 128c. The third light pipe is shaped is generally U-shaped, with an outlet end that directs the blue light perpendicularly toward the central axis 126. The third nonimaging device 130c is attached to the light pipe outlet end. The first and the third nonimaging devices 130a, 130c are registered form a transverse optical axis 131 perpendicular to the central axis 126.

The RGB light expands through the first, second and third nonimaging devices 130a, 130b, 130c, respectively. Each of the RGB components of light is refracted through sizing and collimation optics 132a, 132b, 132c, and passes through polarizers 134a, 134b, 134c before being modulated by transmission through respective RGB LCDs 136a, 136b, 136c. The modulated RGB light components are recombined at a x-prism 138 located at the intersection of the central optical axis 126 and the transverse optical axis 131. The modulated G light is transmitted through the x-prism 138 along the central axis 126, and the R and B light components are reflected 90° to propagate along the central axis. The recombined modulated RGB light is then transmitted to a projection lens 140 which in this embodiment is preferably of telecentric type.

Figure 4:
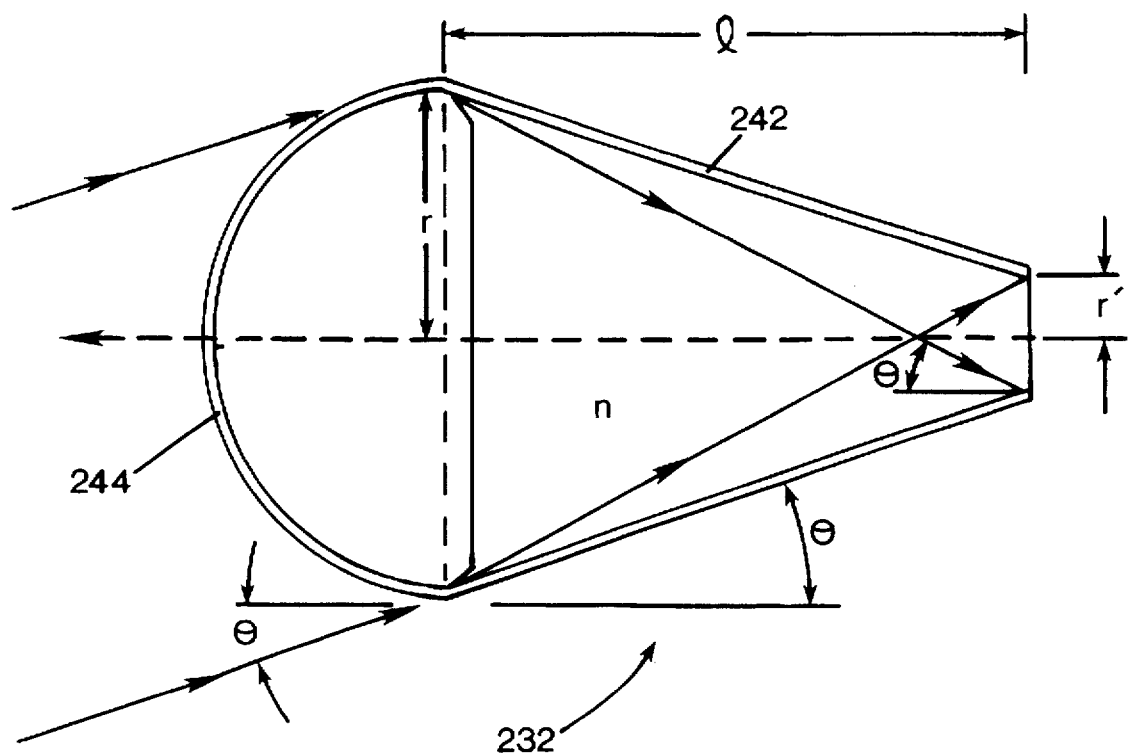
FIG. 4 depicts a nonimaging device capable of collimating light, that is applicable to the projection optical system shown in FIG. 3.

It is also contemplated that the sizing and collimation optics 132a, 132b, 132c could be eliminated by use of a nonimaging device that itself provides suitable sizing and collimation of light. As shown in FIG. 4, such sizing and collimation is made possible through a nonimaging device 232 having a conical portion 242 and an aspherical portion 244. One preferred example of such an aspherical-type nonimaging device is disclosed in U.S. Pat. No. 5,285,318 of Philip Gleckman, which is incorporated by reference herein. The aspherical nonimaging device 232 of FIG. 4 would replace the each of the nonimaging device and collimation optics pairs 130a and 132a, 130b and 132b, and 130c and 132c of the projector of FIG. 3. Elimination of the sizing and collimating optics 132a, 132b, 132c through use of the aspherical-type nonimaging device 232 permits further improvements in projector lightness and compactness.

It is further contemplated that the collection optical elements 127a, 127b, 127c could be replaced with lightconcentrating nonimaging devices. Such nonimaging devices would be of relatively large diameter to permit acceptance of the respective collimated RGB light. Moreover, any of the nonimaging devices types shown in FIGS. 2A, 2B and 4, may be applied to a single-path transmissive light valve-based projector. For instance, the transmissive light valve may be an LCD capable of RGB modulation. It is also contemplated that the nonimaging devices shown in FIGS. 2A, 2B and 4 may also be applied to a three-path reflective light valve-based projector.

It should be apparent that the invention may be embodied in other specific forms without departing from its spirit or essential characteristics. For instance, the specific light pipe paths and projector component configurations shown in the Figures are strictly exemplary, and that projectors and projection optical systems under the present invention may take a wide variety of other forms. For example, the nonimaging device as described herein may be applied to projectors using other types of reflective and transmissive light valves. Moreover, optical components such as dichroic mirrors, x-prisms and Philips prisms are substantially equivalent and may be substituted for one another as appropriate. Various other elements of the optical system, for instance the spherical mirror, may also be replaced by other optical imaging elements. Accordingly, the described embodiments are to be considered in all respects only as illustrated and not restrictive and the scope of the invention is, therefore, indicated by the appended claims.

What is claimed is:

1. An image projector optical system comprising:
   a light source;
   a nonimaging device defined by a edge ray method positioned downstream of the light source;
   a light valve positioned downstream of the nonimaging device;
   a front lens system positioned downstream of the light valve;
   wherein light from the light source is projectable through the nonimaging device onto the light valve.

2. The projector of claim 1, further comprising a light pipe positioned between the light source and the nonimaging device, the light from the light source being transmittable through the light pipe to the nonimaging device.

3. The projector of claim 1, wherein the light valve is a digitally-driven reflective light valve.

4. The projector of claim 1, wherein the light valve is a digitally-driven transmissive light valve.

5. An image projector comprising:
   a light valve having an upstream side and a downstream side;
   a light source disposed on the upstream side of the light valve;
   a front lens system disposed on the downstream side of the light valve, the front lens system having an entrance pupil and;
   a back optical system disposed between the light source and the light valve, the back optical system having a nonimaging device with an exit aperture, the exit aperture being imaged onto at least one of the light valve and the entrance pupil of the front lens system.

6. The projector of claim 5, wherein the back optical system includes a light pipe.

7. The projector of claim 6, wherein the light pipe has a high numerical aperture >0.50.

8. The projector of claim 6, wherein the light pipe has an elongate, curved sheape.

9. The projector of claim 5, wherein the back optical system includes a first curved mirror that focuses light from the light source, the curved mirror having a numerical aperture >0.50.

10. The projector of claim 5, wherein the nonimaging device comprises a light expander.

11. The projector of claim 10, wherein the light expander has a conical shape with small and large diameter ends, and the large diameter end is disposed downstream of the small diameter end.

12. The projector of claim 5, wherein the light valve is a digitally-driven light valve.

13. The projector of claim 5, wherein the light valve is a reflective light valve.

14. The projector of claim 13, wherein the back optical system includes a color wheel.

15. The projector of claim 5, wherein the light valve is a transmissive light valve.

16. The projector of claim 5, wherein a second mirror images the exit aperture into the entrance pupil.

17. The projector of claim 5, wherein the light valve serves as an aperture stop.

18. The projector of claim 5, wherein the exit aperture of the nonimaging device serves as an aperture stop.

19. The projector of claim 18, wherein the exit aperture is rectangular.

* * * * *